Nov. 25, 1969 — J. J. HALKO, JR — 3,480,313
FRAME STRUCTURE
Filed July 25, 1968
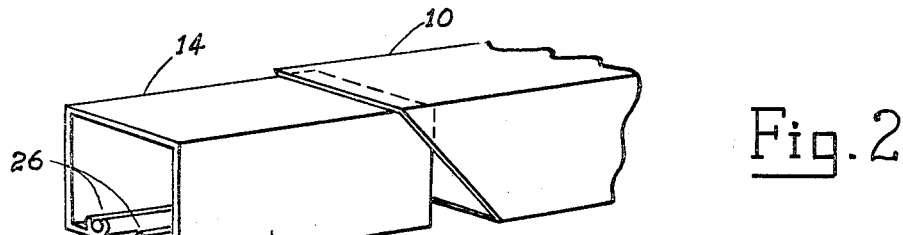
Fig. 2
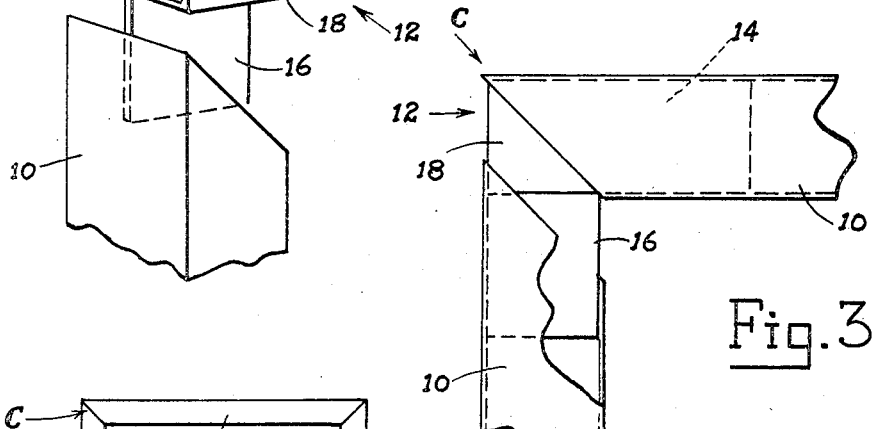
Fig. 3
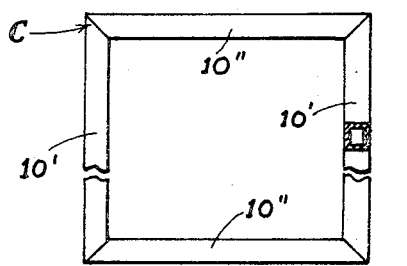
Fig. 1
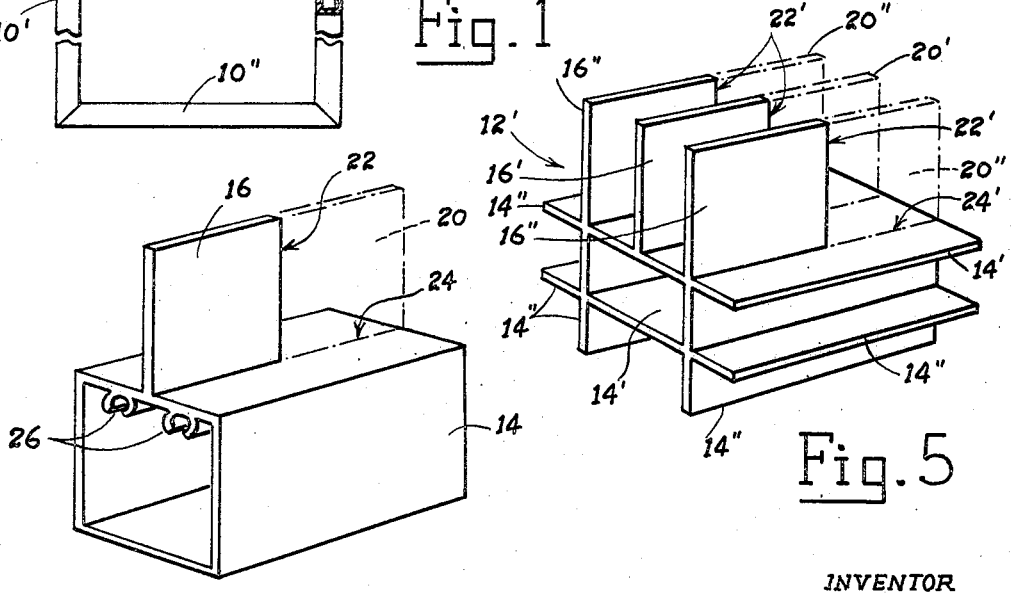
Fig. 4
Fig. 5
INVENTOR
JOHN J. HALKO JR.
BY
Leon Arthurs
AGENT

United States Patent Office 3,480,313
Patented Nov. 25, 1969

3,480,313
FRAME STRUCTURE
John J. Halko, Jr., Inglewood, Ontario, Canada, assignor to John J. Halko, Jr., Ben Burke & Allan A. Blackstien, Downsview, Ontario, Canada, a partnership
Filed July 25, 1968, Ser. No. 747,719
Int. Cl. F16b 1/00, 5/00, 7/00, 9/00
U.S. Cl. 287—189.36                                10 Claims

ABSTRACT OF THE DISCLOSURE

A frame structure having a mitred corner joint comprised of two tubular frame members and a connecting bracket; the bracket having a stem engaged within both of the frame members and a tongue projecting from the stem engaged within one of the frame members.

---

This invention relates to a frame structure such as may be utilized in the formation of, for example, a door or window unit. In particular the invention relates to frame structure having a corner element including two tubular frame members with mitred ends meeting to form a mitred joint of a predetermined angle; the mitred ends of such members being connected by means of an angle bracket.

Mitred joints for joining frame members, including connecting angle brackets for the mitred ends, are known in the prior art. Such mitred joints have been formed in frame structure including tubular frame members having mitred ends connected, for example, at a joint angle of 90° by an angle bracket in the form of two mutually perpendicular arms inserted respectively within the mitred end of each tubular frame member. Such angle brackets frequently have been cast or extruded of aluminum.

It is a first object of the invention to provide frame structure which will obviate various disadvantages associated with the prior art but which will nevertheless be simple and economical to manufacture whilst being sturdy and reliable in use.

It is a further object to provide frame structure including tubular frame members having mitred ends joined together to form a mitred joint and a connecting angle bracket for said ends wherein said bracket effects mating engagement within the mitred ends of both said tubular members.

It is a still further object to provide frame structure including an angle configuration with respect to the tubular members, will maintain the mitred ends of said members at a predetermined angle relative to one another.

It is a still further object to provide frame structure wherein the aforesaid angle bracket comprises two elements received within the mitred ends of the tubular frame members respectively and wherein one of such elements is engageable within the mitred ends of both said tubular members.

It is a yet further object to provide frame structure wherein the tubular frame members thereof and the angle brackets for connecting two adjacent ones of said members are formed by an extrusion process.

It is a yet further object of the invention to provide a method of forming a mitred joint between the mitred ends of two tubular frame members by connecting them by an angle bracket formed in a manner offering various advantages over prior art methods.

It is a still further object to provide a method wherein said bracket is formed from extruded stock which is subsequently operated upon in a quick and simple manner to form the bracket.

The above and other objects, more or less broad than the foregoing, are met, in accordance with the invention, by providing frame structure including two tubular members having mitred ends meeting to form a mitred joint of a predetermined angle and an angle bracket connecting together said mitred ends, said bracket comprising a straight stem of uniform transverse cross-section snugly mated within both of said tubular members, said stem being telescopically contained within one of said tubular members with one end of the stem projecting from the mitred end of said one tubular member and engaged within the mitred end of the other said tubular member, and a tongue extending from the projecting end of said stem with the tongue being so dimensioned and oriented to be matingly received within said other tubular member to maintain the aforesaid predetermined angular relationship between the tubular members within the plane of the frame structure.

The invention also provides a method of joining the mitred ends of two tubular members to form a corner comprising the steps of extruding continuous stock in the form of a spine and at least one fin, extending radially therefrom, the spine being profiled to form a snug sliding fit within the mitred end of one of said tubular members, severing a short length from the stock to form a bracket blank, cutting the fin in the blank at an angle inclined to the direction of extrusion and removing material therefrom to provide a tongue extending laterally from one end of the spine and inclined to the direction of extrusion, the tongue being dimensioned transversely to engage matingly within the mitred end of the other one of said tubular members, slidably engaging the spine within the mitred end of said one tubular member with said one end of the spine projecting therefrom and of slidably engaging the projecting end of the spine and the tongue within the mitred end of said other one of said tubular members.

Other objects of the invention will become apparent from the following description, given by way of example only, with reference to the accompanying drawings wherein:

FIG. 1 is a front elevation of frame structure embodying the present invention;

FIG. 2 is a detailed exploded perspective view of one mitred corner joint of the instant frame structure showing two of the frame members and a connecting angle bracket therebetween;

FIG. 3 is a detailed part cut-away front elevation of the corner joint illustrated in FIG. 2 showing an intermediate step in the assembly of the joint;

FIG. 4 is a perspective view of a connecting angle bracket for the corner joint showing, in chain dot outline, the shape of the remainder of the blank from which the bracket is formed; and FIG. 5 is a perspective view of a further embodiment of a connecting angle bracket for the corner joint showing, in chain dot outline, the shape of the remainder of the blank from which the bracket is formed.

The present invention broadly contemplates a frame structure including two tubular frame members with mitred ends which meet in a corner of the structure to form a mitred joint, the mitred ends being connected together by means of an angle bracket engaged within the said ends. As selected for expository purposes herein, the frame structure as shown in the accompanying drawings comprises a door or window unit made up of four tubular frame members 10 of identical transverse cross-sectional form and four connecting angle brackets 12 therein. The frame members are arranged as two vertical members 10' and two horizontal members 10'' (see FIG. 1), each end of each member being mitred at, for example, 45°, to form a mitred corner joint C of a predetermined angle, in this case 90°, with an adjacent member.

Each frame member at its mitred end is connected to an adjacent member by means of an angle bracket comprising two elements slidably engaged respectively within the mitred ends of the frame members, the elements being so shaped and dimensioned to maintain the predetermined angular relationship, in this example, 90°, between said tubular members.

In accordance with the invention, each angle bracket 12 comprises a stem 14 and a tongue 16 extending laterally from one end 18 thereof. The tongue and stem are so dimensioned and oriented with respect to one another and with respect to the tubular frame members 10 that the stem 14 forms a snug, co-axial, telescopic, slidable fit contained within the mitred end of one tubular member to project from the end thereof; such projecting end together with the tongue being slidably contained within the other tubular member to maintain the angular relationship aforesaid.

Turning now to the specific example illustrated, particularly with reference to FIGS. 2 to 4, each of the four frame members 10 is formed of extruded aluminum tube, or any other suitable material, which may be a plastics material, conveniently so profiled externally (not illustrated) to receive a conventional sliding window or screen and weather-stripping whilst its internal profile, in transverse cross-section, is substantially square. Each angle bracket 12 is also formed of extruded aluminum or other suitable material, which may be a plastics material, the stem 14 thereof comprising a square transverse cross-section tube whose external dimension is slightly less than that of the internal dimension of the tubular members so that the stem 14 forms a snug, co-axial sliding fit within the mitred end of a tubular member 10. The stem is square-cut at each of its ends and at one end 18 thereof there is provided a tongue 16 of planar form extending laterally of the stem from the centre of one of the sides thereof, the plane of the tongue 16 being perpendicular to that side of the stem 14 from it extends.

As stated hereinbefore, each angle bracket is produced by an extrusion process in such manner as to offer various advantages, which will become apparent, when compared with brackets known in the prior art. There is initially extruded continuous stock in the form of a spine and a fin extending radially therefrom, the spine being of hollow, square cross-sectional form and the fin being of planar form projecting perpendicularly from one side face of the spine. The interior surface of the side of the spine from which the fin projects is conveniently formed with two longitudinally extending curved channels, the purpose of which will be more fully explained herein.

To produce a bracket from the extruded stock, the stock is severed at spaced intervals to provide bracket blanks, each of which comprises a spine and a fin as aforesaid. The fin in the blank is then cut at an angle inclined to the direction of extrusion and material is removed therefrom to provide a tongue extending laterally from one end of the spine inclined to the direction of extrusion.

Thus the instant bracket is provided by severing the stock at spaced intervals perpendicular to the direction of extrusion to produce a bracket blank, the overall configuration of which is shown in FIG. 4, comprising a spine 14 and a fin 20, the fin obviously extending over the full length of the spine. To complete the bracket, the fin 20 is cut perpendicular to the spine at a position 22 spaced away from one end thereof and is also cut parallel to the spine, at 24, adjacent that face thereof from which the fin projects thereby removing a plane piece of fin material to leave a tongue 16 extending from the spine, the spine then comprising the bracket stem 14. The transverse dimension of the tongue 16 so formed from the bracket blank is chosen as to be slightly less than the interior dimension of the tubular member 10 with which it is to engage so that said tongue may matingly and sliding engage within the mitred end of a tubular member.

To assemble each mitred corner joint C, the bracket is slid by means of its stem 14 into the mitred end of one of the tubular members 10, the stem being a snug sliding fit within the tublular member, until that edge of the tongue remote from the end of the stem abuts against the edge of the mitred joint. In this position, as shown in FIG. 3, that part 18 of the stem 14 projects from the mitred end of the tubular member in a direction parallel to the axis of the tubular member whilst the tongue 16 extends laterally therefrom. The other tubular member forming the mitred joint at the corner C of the frame structure is then matingly engaged upon the tongue 16, the plane of the tongue lying in the plane of the frame structure, and is subsequently slid over the projecting end 18 of the stem 14. In the construction illustrated, the two mitred ends of the adjacent tubular members abut one another to form a mitred joint therebetween and it will be apparent that, from the dimensions and relative orientation between the stem and the tongue, relative angular movement between the two adjacent tubular members is prevented both in the plane of the frame structure and perpendicular thereto.

If desired, to make a more rigid corner joint, set screws (not shown) may be driven through the face of the tubular member which lies parallel to the square-cut top edge of the stem, the screws engaging within the ends of the curved channels 26 aforesaid to lock that tubular member to the bracket.

An alternative embodiment of angle bracket 12' is shown in FIG. 5 of the drawings.

Such bracket 12' is produced by a similar process to that hereinbefore described but is extruded with a somewhat more complex profile than that described and illustrated in the first embodiment. In this alternative embodiment, the bracket 12' is formed from extruded stock so profiled as to enable each bracket blank to be trimmed if and as desired for mating engagement with and connection between tubular members 10 of differing cross-sectional configurations.

Specifically, as shown in FIG. 5, continuous stock is extruded and severed to provide a bracket blank having a spine and three, or any convenient number, of fins 20' and 20" projecting therefrom. The spine, which becomes the stem 14' in the finished bracket 12', is extruded with flanged extensions 14" of the side walls of its tubular body; two of such extensions 14" forming part of the two outer fins 20".

The bracket is completed by cutting the fins 20' and 20" perpendicular to the spine at position 22' and further cutting the fins at position 24' parallel to the spine adjacent that face of the tubular body portion of the spine from which the fins 20' and 20" project. There is thus removed three plane pieces of fin material 20' and 20" leaving respective tongues 16' and 16" extending from the spine, the spine then comprising the bracket stem 14'.

It will be apparent that the transverse dimensions of the tongues 16' and 16" are chosen as to be slightly less than the interior dimension of the tubular member 10 with which they are to engage so as to be a good mating and sliding fit within the mitred end of such tubular member. However, in this embodiment, the bracket 12' so provided is adapted for mating and sliding engagement within the mitred ends of tubular members 10 of differing cross-sectional configuration by appropriate trimming of the tongues 16' and 16" and/or the extensions 14" if and as desired. For example, the two outer tongues 16" together with all the extensions 14" may be removed completely to form the bracket as shown in FIGS. 2 to 4 of the drawings, or alternatively, the tongues and/or extensions may be trimmed by an appropriate amount for mating and sliding engagement with whatever configuration of tubular member is being utilized in the mitred joint of the frame structure. It will, of course, be realized that the flanged extensions 14" may be so profiled during extrusion for good mating and sliding engagement with the mitred ends of the tubular members 10 without the need for subsequent trimming as aforesaid.

It will be appreciated that curved channels 26 may also be provided in this alternative embodiment of bracket 12' to receive screws for making a more rigid corner joint as described with reference to the first embodiment.

While two embodiments of the invention have been described herein by way of expository purposes only, it will be understood that various modifications may be made therein and it is intended to cover in the appended claims all such modifications as fall within the true spirit and scope of the invention.

What I claimed is:

1. Frame structure including:
   two tubular members having mitred ends meeting to form a mitred joint of a predetermined angle;
   an angle bracket connecting together said mitred ends, said bracket comprising:
      a straight stem of uniform transverse cross-section throughout its length snugly mated within both of said tubular members, said stem being telescopically contained within one of said tubular members with one end of the stem projecting from the mitred end of said one tubular member and engaged within the opening defined by the mitred end of the other said tubular member, and
      at least one generally flat tongue extending transversely from the projecting end of said stem, the cross-section of said tongue being less than that of said stem;
      said tongue having a single dimension corresponding to a cross-sectional dimension of said opening in said other tubular member so as to be matingly received within said other tubular member to maintain the aforesaid predetermined relationship between the tubular members within the plane of the frame structure.

2. Frame structure as claimed in claim 1 wherein said stem is of tubular configuration and said tongue is of planar configuration.

3. Frame structure as claimed in claim 1 wherein the said tubular members are each of identical transverse cross-sectional configuration.

4. Frame structure as claimed in claim 1 wherein said stem comprises longitudinally extending flanges snugly mated within both of said tubular members as aforesaid.

5. Frame structure as claimed in claim 4 wherein said stem comprises a tubular body portion having said flanges projecting laterally therefrom.

6. A method of joining the mitred ends of two tubular members to form a corner comprising the step of:
   providing a pair of tubular members having mitred ends;
   extruding continuous stock in the form of a spine and at least one fin extending radially therefrom, the spine being profiled to form a snug sliding fit within the mitred end of one of said tubular members;
   severing a short length from the stock to form a bracket blank;
   cutting the fin in the blank at an angle inclined to the direction of extrusion and removing material therefrom to provide a tongue extending laterally from one end of the spine and inclined to the direction of extrusion, the tongue being dimensioned transversely to engage matingly within the mitred end of the other one of said tubular members;
   slidably engaging the spine within the mitred end of said one tubular member with said one end of the spine projecting therefrom;
   and of slidably engaging the projecting end of the spine and the tongue within the mitred end of said other one of said tubular members.

7. A method as claimed in claim 6 wherein said blank is severed substantially perpendicular to the direction of extrusion of the stock, and said fin is cut substantially perpendicular to said direction of extrusion in said blank whereby the tongue formed as aforesaid extends substantially perpendicularly from said stem.

8. A method as claimed in claim 6 wherein said spine is extruded in tubular form.

9. A method as claimed in claim 6 wherein said spine is extruded in the form of a plurality of flanges profiled for sliding engagement within the mitred ends of said tubular members as aforesaid.

10. A method as claimed in claim 6 wherein:
    said spine is extruded in the form of a plurality of flanges, and
    said flanges are subsequently trimmed for sliding engagement within the mitred ends of said tubular members as aforesaid.

References Cited

UNITED STATES PATENTS

| | | |
|---|---|---|
| 1,307,876 | 6/1919 | Patterson. |
| 3,357,149 | 12/1967 | Johnston. |

FOREIGN PATENTS

| | | |
|---|---|---|
| 565,351 | 10/1958 | Canada. |

RAMON S. BRITTS, Primary Examiner

U.S. Cl. X.R.

52—656; 287—54